(12) United States Patent
Ataka et al.

(10) Patent No.: US 8,174,230 B2
(45) Date of Patent: May 8, 2012

(54) DRIVE UNIT

(75) Inventors: Ryuji Ataka, Miyagi-Ken (JP);
Tomoaki Tsuchiya, Miyagi-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 288 days.

(21) Appl. No.: 12/704,298

(22) Filed: Feb. 11, 2010

(65) Prior Publication Data
US 2010/0230265 A1 Sep. 16, 2010

(30) Foreign Application Priority Data

Mar. 11, 2009 (JP) ................................. 2009-057815

(51) Int. Cl.
*G05B 11/01* (2006.01)
*H02P 5/00* (2006.01)
*H02P 6/14* (2006.01)
*H02G 3/00* (2006.01)
*G02B 7/182* (2006.01)

(52) U.S. Cl. ............ 318/671; 318/34; 318/49; 318/293; 318/400.27; 318/400.28; 307/10.1; 359/874; 359/876; 359/877

(58) Field of Classification Search .................... 318/34, 318/49, 293, 400.27, 400.28, 671; 200/5 A; 307/10.1; 359/874, 876, 877
See application file for complete search history.

(56) References Cited

U.S. PATENT DOCUMENTS

| | | | | |
|---|---|---|---|---|
| 4,540,252 A * | 9/1985 | Hayashi et al. | ............... | 359/874 |
| 6,657,316 B1 * | 12/2003 | Smith et al. | .................. | 307/10.1 |
| 7,262,375 B2 * | 8/2007 | Sakai | ............................ | 200/5 R |
| 2006/0167606 A1 * | 7/2006 | Malhas | .......................... | 701/49 |
| 2008/0088960 A1 * | 4/2008 | Sim | ................................ | 359/877 |
| 2009/0160374 A1 * | 6/2009 | Sakuma | ......................... | 318/293 |

FOREIGN PATENT DOCUMENTS

JP 64-36538 A 2/1989
JP 6-70499 U 9/1994

* cited by examiner

*Primary Examiner* — Walter Benson
*Assistant Examiner* — Gabriel Agared
(74) *Attorney, Agent, or Firm* — Beyer Law Group LLP

(57) ABSTRACT

A switch section includes a common terminal connected to a terminal at one end of each of a pair of motors, a first terminal connected to a terminal at the other end of one of the motors and a second terminal connected to a terminal at the other end of the other of the motors, and three-contact switches each including one common contact and two switching contacts. In the switch section two switches corresponding to one direction selected from the up and down directions form a switch group, at least one switch corresponding to the other direction selected from the up and down directions is provided, two switches corresponding to one direction selected from the left and right directions form a switch group, and at least one switch corresponding to the other direction selected from the left and right directions is provided.

7 Claims, 11 Drawing Sheets

| SWITCHING DIRECTION | | U | UR | R | DR | D | DL | L | UL |
|---|---|---|---|---|---|---|---|---|---|
| TERMINAL OUTPUT | FIRST | H | Z | Z | Z | L | L | L | H |
| | COMMON | L | H | H | H | H | H | L | L |
| | SECOND | L | L | L | Z | Z | Z | H | H |
| MOTOR OPERATION DIRECTION | | U | R | R | — | D | D | L | UL |

| SWITCHING DIRECTION | | U | UR | R | DR | D | DL | L | UL |
|---|---|---|---|---|---|---|---|---|---|
| TERMINAL OUTPUT | FIRST | H | Z | Z | L | L | L | L | H |
| | COMMON | L | H | H | H | H | H | L | L |
| | SECOND | L | L | L | Z | Z | Z | H | H |
| MOTOR OPERATION DIRECTION | | U | R | R | D | D | D | L | UL |

| SWITCHING DIRECTION | | U | UR | R | DR | D | DL | L | UL |
|---|---|---|---|---|---|---|---|---|---|
| TERMINAL OUTPUT | FIRST | H | Z | Z | L | L | L | L | H |
| | COMMON | L | H | H | H | H | H | L | L |
| | SECOND | L | L | L | Z | Z | Z | H | H |
| MOTOR OPERATION DIRECTION | | U | R | R | D | D | D | L | UL |

| SWITCHING DIRECTION | | U | UR | R | DR | D | DL | L | UL |
|---|---|---|---|---|---|---|---|---|---|
| TERMINAL OUTPUT | FIRST | H | Z | Z | L | L | L | L | L |
| | COMMON | L | H | H | H | H | H | L | L |
| | SECOND | L | L | L | Z | Z | Z | H | H |
| MOTOR OPERATION DIRECTION | | U | R | R | D | D | D | L | L |

| SWITCHING DIRECTION | | U | UR | R | DR | D | DL | L | UL |
|---|---|---|---|---|---|---|---|---|---|
| TERMINAL OUTPUT | FIRST | H | Z | Z | L | L | L | L | H |
| | COMMON | L | H | H | H | H | H | L | L |
| | SECOND | L | L | L | Z | Z | Z | H | L |
| MOTOR OPERATION DIRECTION | | U | R | R | D | D | D | L | U |

| SWITCHING DIRECTION | | U | UR | R | DR | D | DL | L | UL |
|---|---|---|---|---|---|---|---|---|---|
| TERMINAL OUTPUT | FIRST | H | Z | Z | Z | L | L | L | H |
| | COMMON | L | H | H | H | H | H | L | L |
| | SECOND | L | L | L | H | H | H | H | H |
| MOTOR OPERATION DIRECTION | | U | R | R | — | D | D | L | UL |

FIG. 17
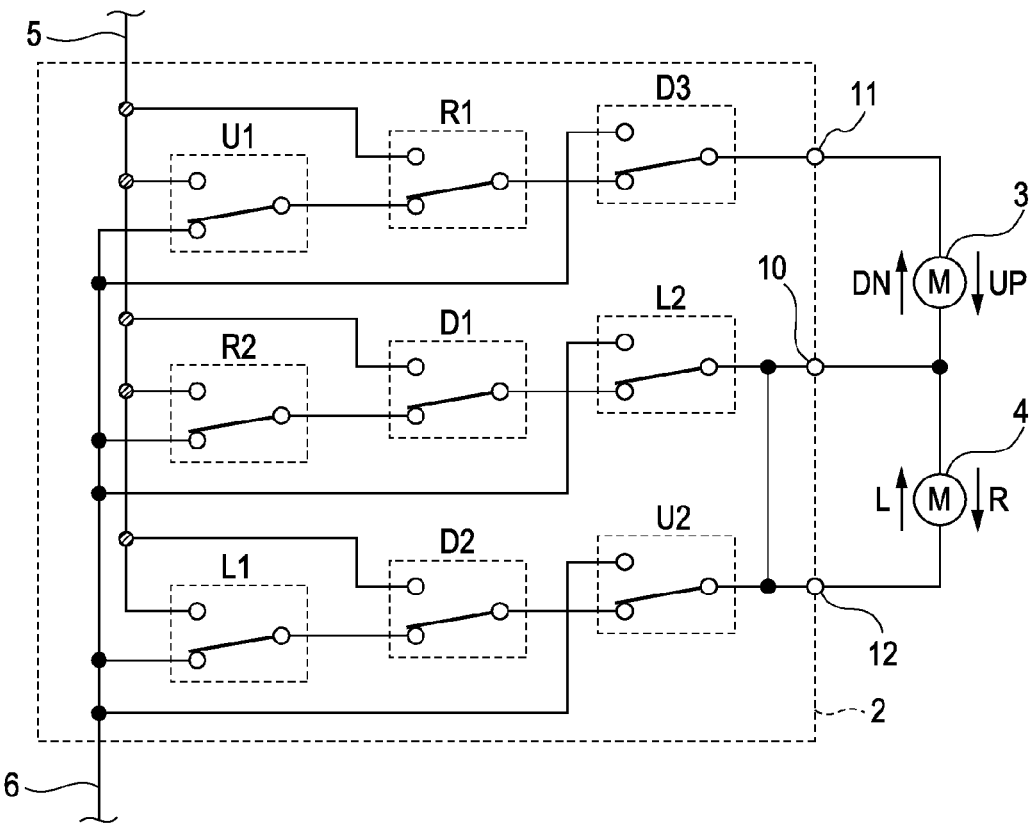
FIG. 18
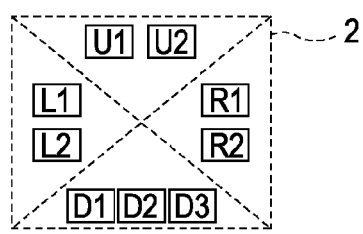
FIG. 19
| SWITCHING DIRECTION | | U | UR | R | DR | D | DL | L | UL |
|---|---|---|---|---|---|---|---|---|---|
| TERMINAL OUTPUT | FIRST | H | H | H | L | L | L | L | H |
| | COMMON | L | H | H | H | H | L | L | L |
| | SECOND | L | L | L | H | H | H | H | L |
| MOTOR OPERATION DIRECTION | | U | R | R | D | D | L | L | U |

| SWITCHING DIRECTION | | U | UR | R | DR | D | DL | L | UL |
|---|---|---|---|---|---|---|---|---|---|
| TERMINAL OUTPUT | FIRST | H | | Z | L | L | | Z | H |
| | COMMON | L | | H | H | H | | L | L |
| | SECOND | Z | | L | L | Z | | H | H |
| MOTOR OPERATION DIRECTION | | U | – | R | DR | D | – | L | UL |

↑ SHORT CIRCUIT ↑ SHORT CIRCUIT

DRIVE UNIT

CLAIM OF PRIORITY

This application claims benefit of the Japanese Patent Application No. 2009-057815 filed on Mar. 11, 2009, which is hereby incorporated by reference.

BACKGROUND OF THE INVENTION

1. Field of the Invention

The present invention relates to a drive unit for driving a vehicle mirror or the like in four directions, and more particularly, to a drive unit which is capable of appropriately operating the mirror when plural directions are simultaneously selected by an operation member.

2. Description of the Related Art

A drive unit capable of driving a vehicle mirror in four directions remotely at a driver's seat is used for adjusting an angle of the mirror surface both vertically and laterally. The drive unit includes an operation member which can be operated in four directions, that is, up, down, left and right, a switch section which is turned ON and OFF in response to the operation of the operation member, a pair of motors connected to the switch section, and a power wire and a grounding wire both connected to the switch section.

FIG. 20 is a circuit diagram of a drive unit of the related art. Referring to the drawing, the drive unit includes a pair of motors 50, 51, a switch section 52 formed of plural switches, a power wire 53 and a grounding wire 54. The motor 50 that is one of the pair of motors is used for vertical driving operations and the motor 51 that is the other thereof is used for lateral driving operations.

The switch section 52 includes a common terminal 52a connected to a terminal at one end of the motor 50 and a terminal at one end of the motor 51, a first terminal 52b connected to a terminal at the other end of the motor 50, and a second terminal 52c connected to a terminal at the other end of the 51. The motor 50 is connected to the common terminal 52a and the first terminal 52b, and rotated forward or reversely upon operation of the switch section 52. The other motor 51 is connected to the common terminal 52a and the second terminal 52c, and rotated forward or reversely upon operation of the switch section 52.

Each of the switches constituting the switch section 52 is formed of a two-contact switch so as to be switchable between ON and OFF. FIG. 21 illustrates a layout of the switches. Referring to the drawing, switch groups each including two switches are arranged at the positions corresponding to up, down, left and right directions, respectively, to form the switch section 52.

Operation states of the drive unit with the aforementioned structure are illustrated in a table shown in FIG. 22. The table shows states of the respective terminals of the switch section 52, and operation directions of the motors 50 and 51. The table further represents the case where a tilting operation is performed in one of four directions by the operation member and two switches in the selected direction are operated simultaneously, and the case where the operation member is tilted with a large force in the direction between two adjacent directions, and four switches in the two adjacent directions are operated simultaneously. Referring to the table, the symbol "U" denotes the up direction, "D" denotes the down direction, "R" denotes the right direction, and "L" denotes the left direction relative to the direction of the operated switch and the motor operation direction. The symbols "H", "L" and "Z" in a section of "terminal output" in the table denote a state connected to the power wire 53, a state connected to the grounding wire 54, and an open state, respectively. Those symbols are employed in the following description.

Referring to FIG. 22, when the operation in one direction selected from the four directions is performed by the operation member, two switches corresponding to the tilting direction are activated to enable the motors 50 and 51 to perform predetermined operations. Meanwhile, in the case where the operation member is tilted in the direction between the down and right directions, that is, the direction DR, the switches D1, D2, R1 and R2 are turned ON to connect the common terminal 52a to the power wire, and the first terminal 52b and the second terminal 52c to the grounding wire so as to activate the two motors 50 and 51 simultaneously. In the case where the tilting operation is performed in the direction between the up and left directions, that is, the direction UL, the switches U1, U2, L1 and L2 are turned ON to connect the common terminal 52a to the grounding wire, and the first terminal 52b and the second terminal 52c to the power wire so as to activate the two motors 50 and 51 simultaneously as well. In the case where the tilting operation is performed in the direction between the up and the right directions, that is, the direction UR, the switches U1, U2, R1 and R2 are turned ON simultaneously. As the switches U2 and R1 are simultaneously turned ON, the short circuit may occur. The tilting operation in the direction between the down and the left directions, that is, the direction DL turns the switches L1, L2, D1 and D2 ON simultaneously. As the switches L1 and D2 are simultaneously turned ON, the short circuit may occur likewise the case as described above.

In addition to the two-contact switch constituting the switch section 52, a three-contact switch having a common contact and two switching contacts has been known and used to constitute the switch section. The use of the three-contact switch prevents the short circuit caused by simultaneously operating the operation member in plural directions. The above-structured drive unit is disclosed in Japanese Unexamined Patent Application Publication No. 64-36538, for example.

The disclosed drive unit is structured to allow three switches to be operated in four ways in response to the operation of the operation member. However, the specific structure of the switch and the process for the switching operation are not disclosed. The behavior of the drive unit operated in a predetermined direction is unstable, which may fail to bring the operation into a stable state.

SUMMARY OF THE INVENTION

The present invention provides a drive unit that is simplified in structure, operates stably, and is prevented from being short-circuited in the case of simultaneous operations in plural directions.

A drive unit according to an aspect of the invention includes an operation member which is operable in four directions of up, down, left and right, a switch section formed of a switch or a switch group arranged at each of four positions corresponding to operation directions of the operation member, a pair of motors to which the switch section is connected, a grounding wire and a power wire. The switch section includes a common terminal connected to a terminal at one end of each of the pair of motors, a first terminal connected to a terminal at the other end of one of the motors, a second terminal connected to a terminal at the other end of the other of the motors, and three-contact switches each including one common contact and two switching contacts. In the switch section, two switches corresponding to one direction selected from the up and down directions form a switch group, at least one switch corresponding to the other direction selected from the up and down directions is provided, two switches corresponding to one direction selected from the left and right directions form a switch group, and at least one switch corresponding to the other direction selected from the left and right directions is provided. The common terminal is connected to one of the switches corresponding to the one direction selected from the up and down directions, and the switch is further connected in series to one of the switches corresponding to the one direction selected from the left and right directions. The first terminal is connected to the other of the switches corresponding to the one direction selected from the left and right directions, and the switch is connected in series to the switch corresponding to the other direction selected from the up and down directions. The second terminal is connected to the other of the switches corresponding to the one direction selected from the up and down directions, and the switch is connected in series to the switch corresponding to the other direction selected from the left and right directions. The one of the switches corresponding to the one direction selected from the up and down directions connected to the common terminal is connected to the switch in series when the operation member is not operated, and is connected to the power wire when the operation member is operated. When the operation member is not operated, the other of the switches corresponding to the one direction selected from the left and right directions connected to the first terminal is connected to the switch corresponding to the other direction selected from the up and down directions and the other of the switches corresponding to the one direction selected from the up and down directions connected to the second terminal is connected to the switch corresponding to the other direction selected from the left and right directions, and the switch connected to the first terminal and the switch connected to the second terminal are brought into open states when the operation member is operated. The switches of the switch section connected to the common terminal, the switch corresponding to the other direction selected from the left and right directions, and the switch corresponding to the other direction selected from the up and down directions are connected to the grounding wire when the operation member is not operated, and are connected to the power wire when the operation member is operated.

In the drive unit according to the aspect of the invention, the switch section may further include a second switch corresponding to the other direction selected from the left and right directions. The second switch is connected to the first terminal in parallel with the one of the switches corresponding to the one direction selected from the left and right directions. The second switch is connected to a contact at an open side of the other of the switches corresponding to the one direction selected from the up and down directions connected to the second terminal when the operation member is not operated. The second switch is brought into an open state when the operation member is operated.

In the drive unit according to the aspect of the invention, a contact at an open side of the other of the switches corresponding to the one direction selected from the left and right directions connected to the first terminal may be connected to a contact at an open side of the other of the switches corresponding to the one direction selected from the up and down directions connected to the second terminal.

In the drive unit according to the aspect of the invention, a second switch corresponding to the other direction selected from the left and right directions may be provided in series between the other of the switches corresponding to the one direction selected from the left and right directions and the first terminal. The second switch is connected to the other of the switches corresponding to the one direction selected from the left and right directions when the operation member is not operated, and is connected to the grounding wire when the operation member is operated.

In the drive unit according to the aspect of the invention, a second switch corresponding to the other direction selected from the up and down directions may be provided in series between the other of the switches corresponding to the one direction selected from the up and down directions and the second terminal. The second switch is connected to the other of the switches corresponding to the one direction selected from the up and down direction when the operation member is not operated, and is connected to the grounding wire when the operation member is operated.

In the drive unit according to the aspect of the invention, the other of the switches corresponding to the one direction selected from the up and down directions connected to the second terminal may be connected to the power wire instead of being opened when the operation member is operated.

In the drive unit according to the aspect of the invention, a second switch corresponding to the other direction selected from the up and down directions may be provided in series between the other of the switches corresponding to the one direction selected from the up and down directions and the second terminal. The second switch is connected to the other of the switches corresponding to the one direction selected from the up and down directions when the operation member is not operated, and is connected to the grounding wire when the operation member is operated. A second switch corresponding to the other direction selected from the left and right directions may be provided in series between the one of the switches corresponding to the one direction selected from the up and down directions and the common contact. The second switch is connected to one of the switches corresponding to the one direction selected from the up and down directions when the operation member is not operated, and is connected to the grounding wire when the operation member is operated. A third switch corresponding to the one direction selected from the up and down directions may be provided in series between the other of the switches corresponding to the one direction selected from the left and right directions and the first terminal. The third switch is connected to the other of the switches corresponding to the one direction selected from the left and right directions when the operation member is not operated, and is connected to the grounding wire when the operation member is operated.

The drive unit according to the aspect of the invention has a simplified structure and stably operates without causing short circuit between terminals of the motor even if operations corresponding to plural directions are performed simultaneously.

The drive unit according to the aspect of the invention is configured such that the motors are prevented from being disabled and operate in a certain direction when a plurality of specific operations are performed.

The drive unit according to the aspect of the invention is configured such that the bidirectional motor operation resulting from performing the plurality of specific operations is prevented, and the motors operate in a certain direction.

BRIEF DESCRIPTION OF THE DRAWINGS

FIG. 17 is a circuit diagram of a drive unit according to a seventh embodiment;

FIG. 18 illustrates a layout of switches constituting a switch section according to the seventh embodiment;

FIG. 19 is a table which represents operation states in the seventh embodiment;

DESCRIPTION OF THE PREFERRED EMBODIMENTS

Figure 1:
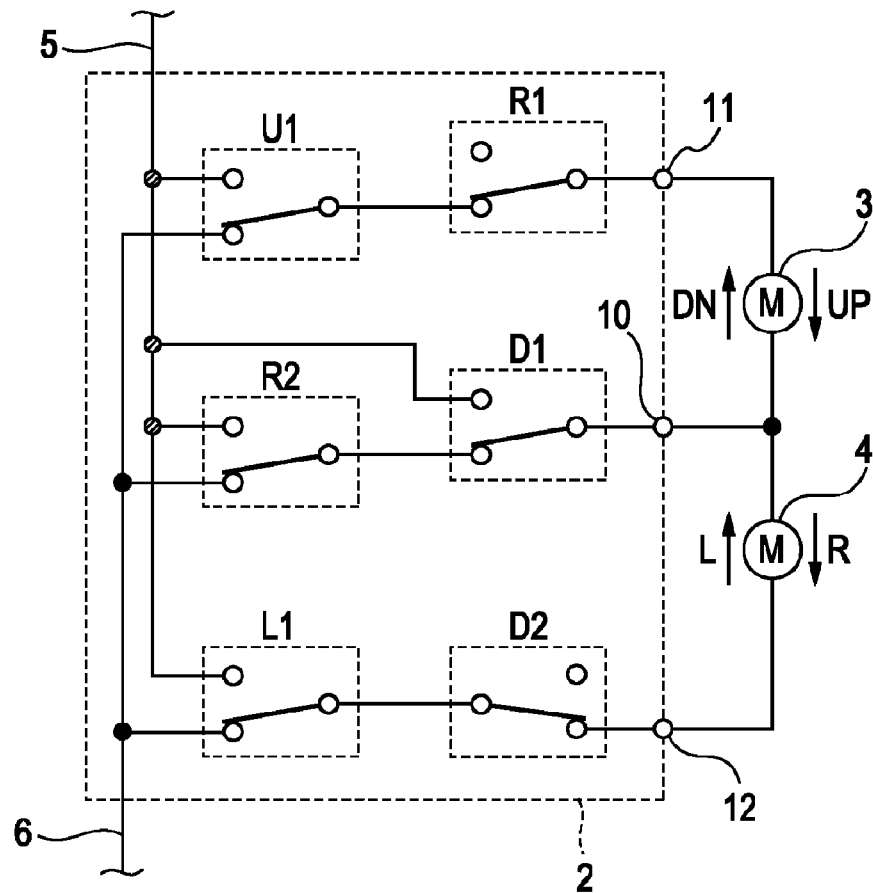
FIG. 1 is a circuit diagram of a drive unit according to a first embodiment.

Embodiments according to the present invention will be described referring to the drawings. FIG. 1 is a circuit diagram of a drive unit according to a first embodiment. The drive unit of the embodiment is used for driving side mirrors of a vehicle to direct the mirror surface both vertically and laterally. Referring to FIG. 1, the drive unit includes a pair of motors, that is, a first motor 3 and a second motor 4, a switch section 2 for switching power supply to the motors, a power wire 5 connected to a power source, and a grounding wire 6 which is grounded.

Figure 2:
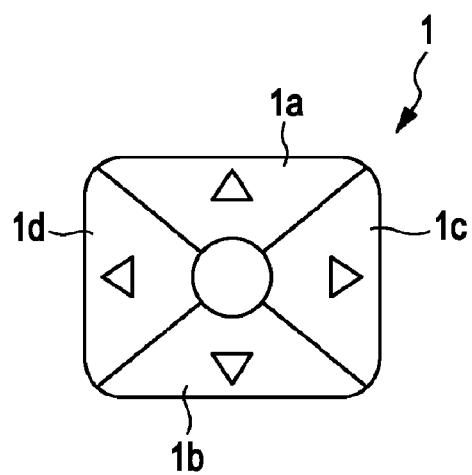
FIG. 2 is a plan view of an operation member.

The switch section 2 includes plural switches which are depressed and operated by an operation member 1. FIG. 2 is a plan view of the operation member 1. The operation member 1 is provided at the driver's seat in the vehicle, and held tiltably in plural directions. The operation member 1 is tilted through depression in a direction selected from the up, down, left and right so that the mirror is operated in the selected direction. The operation member 1 includes an upper operation section 1a for tilting the mirror surface upward, a lower operation section 1b for tilting the mirror surface downward, a right operation section 1c for tilting the mirror surface rightward, and a left operation section 1d for tilting the mirror surface leftward. Normally, those operation sections are independently operated through depression. When the portion around the boundary between two adjacent sections is depressed for operating the single member, the adjacent operation sections will be simultaneously operated.

Each of the switches which constitute the switch section 2 is formed as a three-contact switch having a common contact and two switching contacts, which is a sliding switch of self return type. The contact is switched in response to the operation of the operation member 1. Each of the switches corresponding to the respective directions is structured to be driven by the operation member via a common drive axis. Switches R1 and R2 are structured to be operated simultaneously. Switches D1 and D2 are structured to be operated simultaneously. As the aforementioned structure is known, the explanation with respect to further details will be omitted in this and subsequent embodiments. The switch section 2 includes a common terminal 10 connected to a terminal at one end of the first motor 3 and a terminal at one end of the second motor 4, a first terminal 11 connected to a terminal at the other end of the first motor 3, and a second terminal 12 connected to a terminal at the other end of the second motor 4.

The first motor 3 is connected to the common terminal 10 and the first terminal 11 of the switch section 2, and rotated forward or reversely upon operation of the switch section 2 to drive the mirror surface to be directed upward or downward. Specifically, the electric current is applied from the first terminal 11 to the common terminal 10 to drive the mirror surface to be directed upward, and from the common terminal 10 to the first terminal 11 to drive the mirror surface to be directed downward. The second motor 4 is connected to the common terminal 10 and the second terminal 12 of the switch section 2, and rotated forward or reversely upon operation of the switch section 2 to drive the mirror surface to be directed leftward or rightward. Specifically, the electric current is applied from the common terminal 10 to the second terminal 12 to drive the mirror surface to be directed rightward, and from the second terminal 12 to the common terminal 10 to drive the mirror surface to be directed leftward. Alternatively, the first motor 3 may be used to direct the mirror surface leftward/rightward and the second motor 4 may be used to direct the mirror surface upward/downward.

Figures 3, 4:
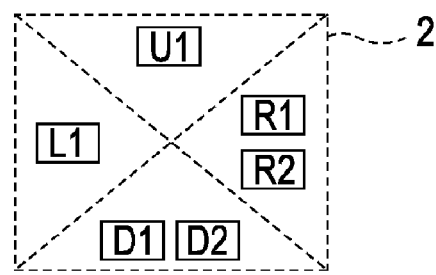
FIG. 3 illustrates a layout of switches constituting a switch section according to the first embodiment.
FIG. 4 is a table which represents operation states in the first embodiment.

FIG. 3 illustrates a layout of the respective switches which constitute the switch section 2. Referring to the drawing, the switches are arranged at up, down, right and left positions corresponding to the up, down, right and left tilting directions of the operation member 1. A single switch U1 is provided at the up position, and the two switches D1 and D2 which constitute a switch group are provided at the down position. The two switches R1 and R2 which constitute a switch group are provided at the right position, and a switch L1 is provided at the left position.

Referring to FIG. 1, the common contact of the switch D1 at the down position is connected to the common terminal 10. The switch R2 at the right position is connected in series to one of the switching contacts of the switch D1. The other of the switching contacts of the switch D1 is connected to the power wire 5. The switch R2 is connected to the switch D1 at the common contact, having one switching contact connected to the grounding wire 6, and the other switching contact connected to the power wire 5, respectively.

FIG. 1 illustrates that no switches are operated. In this state, the switch D1 is connected to the switch R2 to which the grounding wire 6 is connected.

The first terminal 11 is connected to the common contact of the switch R1 at the right position. The switch U1 at the up position is connected in series to one of the switching contacts of the switch R1. The other of the switching contacts of the switch R1 is in an open state. The switch U1 is connected to the switch R1 at the common contact, having one switching contact connected to the grounding wire 6 and the other switching contact connected to the power wire 5, respectively.

When none of the switches shown in FIG. 1 is operated, the switch R1 is connected to the switch U1 to which the grounding wire 6 is connected.

The second terminal 12 is connected to one of the switching contacts of the switch D2 at the down position. The switch L1 at the left position is connected in series to the common contact of the switch D2. The other of the switching contacts of the switch D2 is in the open state. The switch L1 is connected to the switch D2 at the common contact, having one switching contact connected to the grounding wire 6, and the other switching contact connected to the power wire 5, respectively.

When the switches shown in FIG. 1 are not operated, the switch D2 is connected to the second terminal 12, and the switch L1 is connected to the grounding wire 6.

The operation of the thus connected circuit upon activation of the operation member 1 will be described. FIG. 4 is a table representing operation states of the first embodiment. The term SWITCHING DIRECTION in the table denotes the tilted direction. In the table, U, R, D and L denote upward (UP side), rightward (RIGHT side), downward (DOWN side), and leftward (LEFT side). The symbol UR denotes an intermediate position between the UP side and RIGHT side for tilting the operation member 1 in the corresponding direction. The symbols DR, DL and UL denote intermediate positions between DOWN side and RIGHT side, DOWN side and LEFT side, and UP side and LEFT side, respectively. The terms FIRST, COMMON, and SECOND denote outputs of the first terminal 11, the common terminal 10 and the second terminal 12, respectively. The symbols H, L, and Z denote power-supply voltage, ground voltage, and open state, respectively. The term MOTOR OPERATION DIRECTION denotes the direction in which the mirror surface is tilted by the two motors. The symbols U and D denote driving operations performed by the motor 3 to direct the mirror surface upward and downward, respectively. The symbols R and L denote driving operations performed by the motor 4 to direct the mirror surface rightward and leftward, respectively. The symbol UL denotes driving operations to direct the mirror surface upward and leftward simultaneously. The symbol "–" denotes no driving operation performed by the motors. The aforementioned symbols and terms will be applied to the subsequent embodiments.

The operation will be described more specifically. When the upper operation section 1a of the operation member 1 is operated, the switch U1 shown in FIG. 3 is only switched. As a result, electric current from the common terminal 10 to the first terminal 11 is applied to the first motor 3 to drive the mirror surface upward. Meanwhile, the second motor 4 has the terminals grounded, and accordingly, is not activated.

When the lower operation section 1b of the operation member 1 is operated, the switches D1 and D2 shown in FIG. 3 are simultaneously switched. The electric current from the common terminal 10 to the first terminal 11 is applied to the first motor 3 to drive the mirror surface downward. Meanwhile, the second motor 4 is not activated as the switch D2 is in the open state.

When the right operation section 1c of the operation member 1 is operated, the switches R1 and R2 shown in FIG. 3 are simultaneously switched. As a result, the first motor 3 is not activated as the switch R1 is in the open state. The electric current from the common terminal 10 to the second terminal 12 is applied to the second motor 4 to drive the mirror surface rightward.

When the left operation section 1d of the operation member 1 is operated, the switch L1 shown in FIG. 3 is switched. The first motor 3 is not activated as both terminals are grounded. The electric current from the second terminal 12 to the common terminal 10 is applied to the second motor 4 to drive the mirror surface leftward.

The operation resulting from simultaneous operation of the operation member 1 in plural directions will be described. The upper operation section 1a and the right operation section 1c of the operation member 1 are operated simultaneously. In other words, when the portion around the boundary between the upper operation section 1a and the right operation section 1c is depressed, all the switches at the up-position and right-position are switched. The switches U1, R1 and R2 shown in FIG. 3 are simultaneously switched. The first motor 3 is not activated as the switch R1 is in the open state. The electric current from the common terminal 10 to the second terminal 12 is applied to the second motor 4 to drive the mirror surface rightward.

The lower operation section 1b and the right operation section 1c of the operation member 1 are simultaneously operated. In other words, when the portion around the boundary between those sections 1b and 1c is depressed, all the switches at the down-position and the right-position are switched. The switches D1 and D2, and switches R1 and R2 shown in FIG. 3 are simultaneously switched. The first motor 3 is not activated as the switch R1 is in the open state, and the second motor 4 is not activated as the switch D2 is in the open state. In this case, both motors are not activated.

The lower operation section 1b and the left operation section 1d of the operation member 1 are simultaneously operated. In other words, when the portion around the boundary between those sections 1b and 1d is depressed, all the switches at the down-position and the left-position are switched. The switches D1, D2, and L1 shown in FIG. 3 are simultaneously switched. The electric current from the common terminal 10 to the first terminal 11 is applied to the first motor 3 to drive the mirror downward. The second motor 4 is not activated as the switch D2 is in the open state.

The upper operation section 1a and the left operation section 1d of the operation member 1 are simultaneously operated. In other words, when the portion around the boundary between those sections 1a and 1d is depressed, all the switches at the up-position and the left-position are switched. The switches U1 and L1 shown in FIG. 3 are simultaneously switched. The electric current from the first terminal 11 to the common terminal 10 is applied to the first motor 3 to drive the mirror upward. The electric current from the second terminal 12 to the common terminal 10 is applied to the second motor 4 to drive the mirror leftward. In this case, the mirror is simultaneously driven bidirectionally.

The switch section 2 structured as illustrated in FIG. 1 prevents the short circuit to occur. That is, the power wire 5 and the grounding wire 6 are prevented from being connected without the motor not only in the case where the operation member 1 is operated unidirectionally, but also in the case where the operation member 1 is simultaneously operated bidirectionally.

Figure 5:
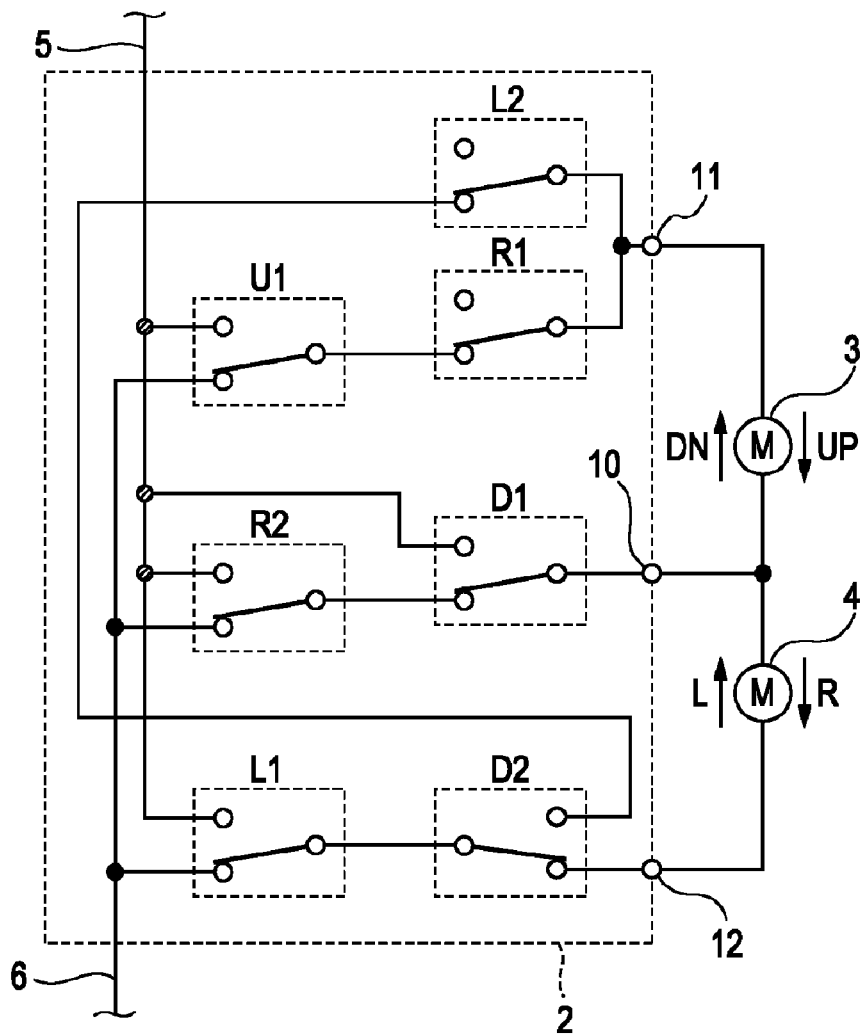
FIG. 5 is a circuit diagram of a drive unit according to a second embodiment.
Figure 6:
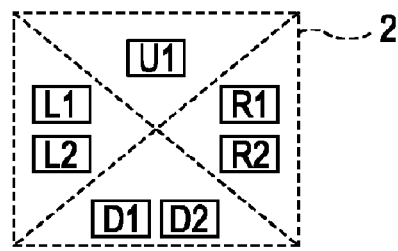
FIG. 6 illustrates a layout of switches constituting a switch section according to the second embodiment.

A second embodiment according to the present invention will be described hereinafter. FIG. 5 is a circuit diagram of the drive unit according to the second embodiment. FIG. 6 illustrates a layout of the switches which constitute the switch section 2. Referring to FIG. 6, unlike the first embodiment, the drive unit according to this embodiment is further provided with a switch L2 at the left-position. The other arrangement is the same as that of the first embodiment.

Referring to FIG. 5, the layout of the switches of the switch section 2 in the circuit is substantially the same as that of the first embodiment. Meanwhile, the switch L2 at the left-position added to the structure of the first embodiment is connected to the first terminal 11 in parallel with the switch R1. The switch L2 has the common contact connected to the first terminal 11, one switching contact connected to the contact of the switch D2 at the open side, and the other switching contact kept in the open state. When the switches shown in FIG. 5 are not operated, the switch L2 is connected to the switch D2.

Figures 7, 8:
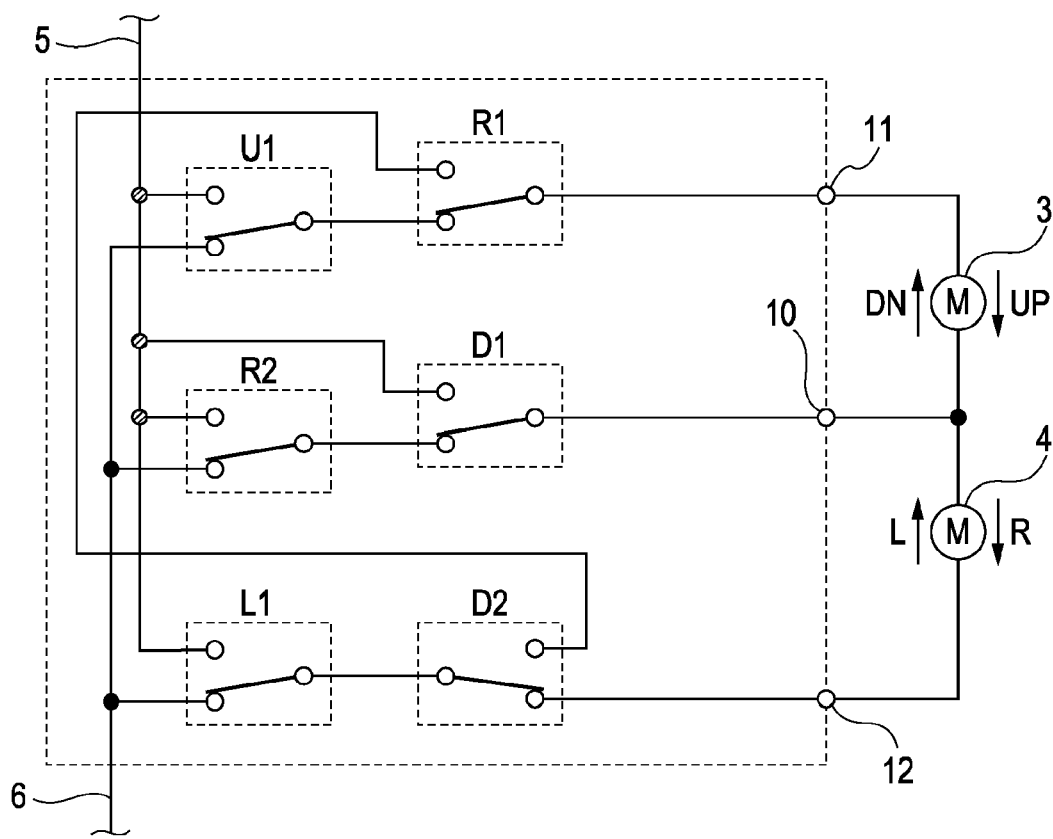
FIG. 7 is a table which represents operation states in the second embodiment.
FIG. 8 is a circuit diagram of a drive unit according to a third embodiment.

The operation of the thus connected circuit upon operation of the operation member 1 will be described. The operation in the embodiment is substantially the same as the one according to the first embodiment except the operation performed when the lower operation section 1b and the right operation section 1c are simultaneously operated. The explanation with respect to the similar operation, thus, will be omitted. FIG. 7 is a table showing operation states of the switch section 2.

When the lower operation section 1b and the right operation section 1c of the operation member 1 are simultaneously operated, the switches D1 and D2, and switches R1 and R2 are simultaneously switched, respectively. As a result, the switch D2 is connected to the switch L1. The electric current from the common terminal 10 to the first terminal 11 is applied to the first motor 3 to drive the mirror surface downward. Meanwhile, the second motor 4 is not activated as the switch D2 is in the open state.

When the left operation section 1d of the operation member 1 is only operated, or operated together with other sections simultaneously, the switch L1 is brought into the open state, thus giving no influence on the other operation. When the lower operation section 1b of the operation member 1 is only operated, the switch D2 is connected to the switch L1 to have the first terminal 11 connected to the grounding wire 6. At this time, the operation is not affected since the first terminal 11 is connected to the grounding wire 6 via the switches R1 and U1.

In the first embodiment, when the lower operation section 1b and the right operation section 1c of the operation member 1 are simultaneously operated, the motors are not operated as clearly indicated by the DR direction as the direction of the operated switch shown in FIG. 4. In this embodiment, the first terminal 11 is bypassed to the grounding wire 6, so that when the operation member 1 is operated in any direction, the mirror is driven toward the corresponding direction, as clearly indicated by FIG. 7.

A third embodiment according to the present invention will be described. FIG. 8 illustrates the circuit diagram of the drive unit according to the third embodiment. In the embodiment, the arrangement of the switches which constitute the switch section 2 is the same as that of the first embodiment. Referring to FIG. 8, each circuit arrangement of the respective switches forming the switch section 2 of the circuit is similar to that of the first embodiment. Meanwhile, in the embodiment, the contact at the open side of the switch R1 is connected to the contact at the open side of the switch D2.

Figures 9, 10:
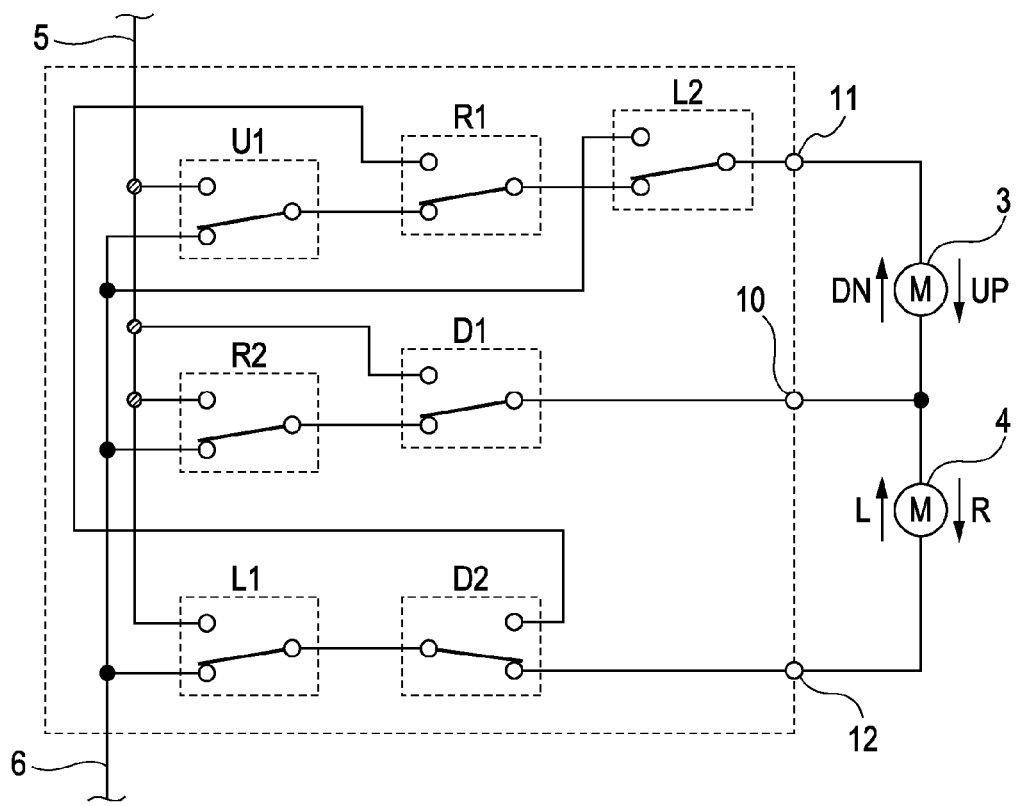
FIG. 9 is a table which represents operation states in the third embodiment.
FIG. 10 is a circuit diagram of a drive unit according to a fourth embodiment.

The operation of the operation member 1 in the thus connected circuit will be described. In this embodiment, the operation is substantially the same as in the first embodiment except the operation performed when the lower operation section 1b and the right operation section 1c are simultaneously operated. The explanation with respect to the similar operation will be omitted. FIG. 9 is the table representing operation states of the switch section 2.

When the lower operation section 1b and the right operation section 1c of the operation member 1 are simultaneously operated, the switches D1 and D2, and the switches R1 and R2 illustrated in FIG. 5 are simultaneously switched, respectively such that the switch D2 is connected to the switch R1. The switch R1 is switched to be connected to the common contact to connect the first terminal 11 to the grounding wire 6. The common terminal 10 is connected to the power wire 5 via the switch D1. As a result, the electric current from the common terminal 10 to the first terminal 11 is applied to the first motor 3 to drive the mirror surface downward. Meanwhile, the second motor 4 is not activated as the switch D2 is in the open state.

In this embodiment, connection between the switches D2 and R1 is established only when the lower operation section 1b and the right operation section 1c of the operation member 1 are simultaneously operated. The operation will not be affected by the operation other than those described above.

In the case where the operation member 1 is operated in any direction, connection between the contact at the open side of the switch D2 and the contact at the open side of the switch R1 allows the mirror surface to be driven in the corresponding direction without adding the switch as in the second embodiment.

A fourth embodiment according to the present invention will be described. FIG. 10 is a circuit diagram of the drive unit according to the fourth embodiment. The layout of the switches of the switch section 2 is the same as that of the second embodiment.

The drive unit of the present embodiment is formed by adding a switch L2 to the drive unit of the third embodiment between the first terminal 11 and the switch R1 of the switch section 2. The other structure is the same as that of the third embodiment. The switch L2 is connected to the first terminal 11 at the common contact side, having one switching contact connected to the switch R1 and the other switching contact connected to the grounding wire 6. The switch L2 is connected to the switch R1 in the state where none of the switches shown in FIG. 10 is operated.

Figures 11, 12:
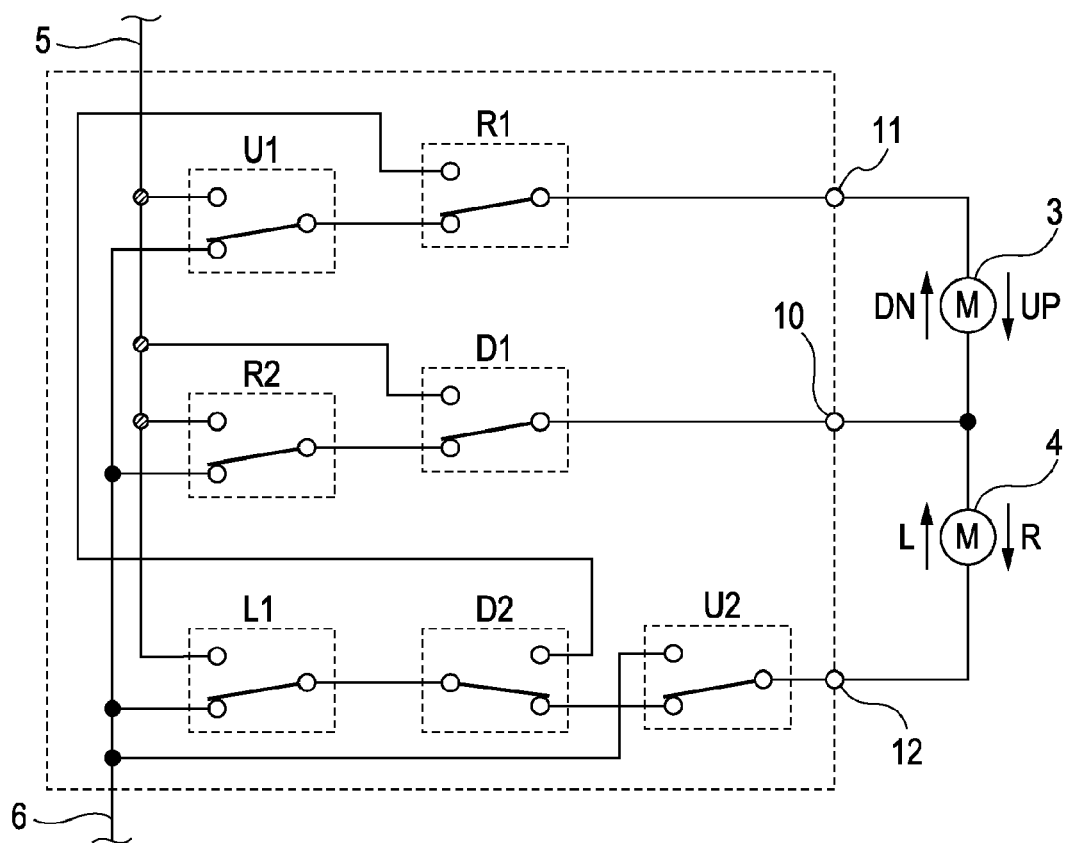
FIG. 11 is a table which represents operation states in the fourth embodiment.
FIG. 12 is a circuit diagram of a drive unit according to a fifth embodiment.

The operation of the thus connected circuit upon operation of the operation member 1 will be described. In the present embodiment, the operation performed when the upper operation section 1a and the left operation section 1d of the operation member 1 are simultaneously operated is different from the one in the third embodiment. The explanation with respect to the similar operation will be omitted. FIG. 11 is a table representing the operation states of the switch section 2.

When the upper operation section 1a and the left operation section 1d of the operation member 1 are simultaneously operated, the switches U1, L1 and L2 are simultaneously switched. The switch L2 is then connected to the grounding wire 6 to which the common terminal 10 has been connected. Because of the same potential at both terminals, the first motor 3 is not activated. Meanwhile, the second terminal 12 is connected to the power wire 5, and the common terminal 10 is connected to the grounding wire 6 to allow the second motor 4 to drive the mirror surface leftward.

When the left operation section 1d of the operation member 1 is only operated, the switch L2 is connected to the grounding wire 6 at the side of the first terminal 11. However, the operation is not affected since the common terminal 10 is also connected to the grounding wire 6.

In the first to the third embodiments, there is the case where the mirror is driven in the plural directions. In the fourth embodiment, the switch L2 is provided at the side of the first terminal 11 to be bypassed to the grounding wire 6 when the left operation section 1d is operated. Such structure may prevent the mirror from being driven in the simultaneously selected plural directions.

Figures 13, 14:
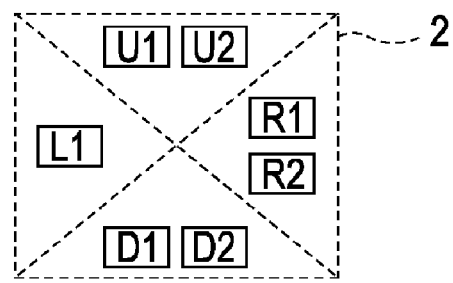
FIG. 13 illustrates a layout of switches constituting a switch section according to the fifth embodiment.
FIG. 14 is a table which represents operation states in the fifth embodiment.

A fifth embodiment according to the present invention will be described. The drive unit of this embodiment is obtained by adding one switch to the structure of the third embodiment. FIG. 12 is a circuit diagram of the drive unit according to the fifth embodiment. FIG. 13 illustrates the layout of switches of the switch section 2. Referring to FIG. 13, the drive unit of this embodiment is formed by adding a switch U2 to the structure of the third embodiment at the up-position. The switches at the other positions of the embodiment are the same as those of the third embodiment.

Referring to FIG. 12, the embodiment is obtained by adding the switch U2 to the drive unit of the third embodiment between the second terminal 12 and the switch D2 of the switch section 2. Likewise the fourth embodiment, the switch U2 is designed to bypass the second terminal 12 to the grounding wire 6 when the upper operation section 1a and the left operation section 1d are simultaneously operated. This may prevent the simultaneous operation of the first motor 3 and the second motor 4.

The switch U2 is connected to the second terminal 12 at the common contact side, having one switching contact connected to the switch D2, and the other switching contact connected to the grounding wire 6. When none of the switches shown in FIG. 13 is operated, the switch U2 is connected to the switch D2.

The operation of the thus connected circuit upon operation of the operation member 1 will be described. In this embodiment, the operation to be performed when the upper operation section 1a and the left operation section 1d of the operation member 1 are simultaneously operated is different from the operation of the third embodiment. The explanation with respect to the similar operations will be omitted. FIG. 14 is a table representing the operation states of the switch section 2.

When the upper operation section 1a and the left operation section 1d of the operation member 1 are simultaneously operated, the switches U1, U2 and L1 shown in FIG. 13 are switched simultaneously. The switch U2 is then connected to the grounding wire 6 to which the common terminal 10 has been connected. Each potential at both terminals of the second motor 4 becomes the same, and the second motor 4 is not activated. Meanwhile, the first motor 3 has the first terminal 11 connected to the power wire 5 and the common terminal 10 connected to the grounding wire 6, and accordingly, drives the mirror surface upward.

When the upper operation section 1a of the operation member 1 is only operated, the switch U2 at the side of the second terminal 12 is connected to the grounding wire 6. However, the operation is not affected since the common terminal 10 is also connected to the grounding wire 6.

Figures 15, 16:
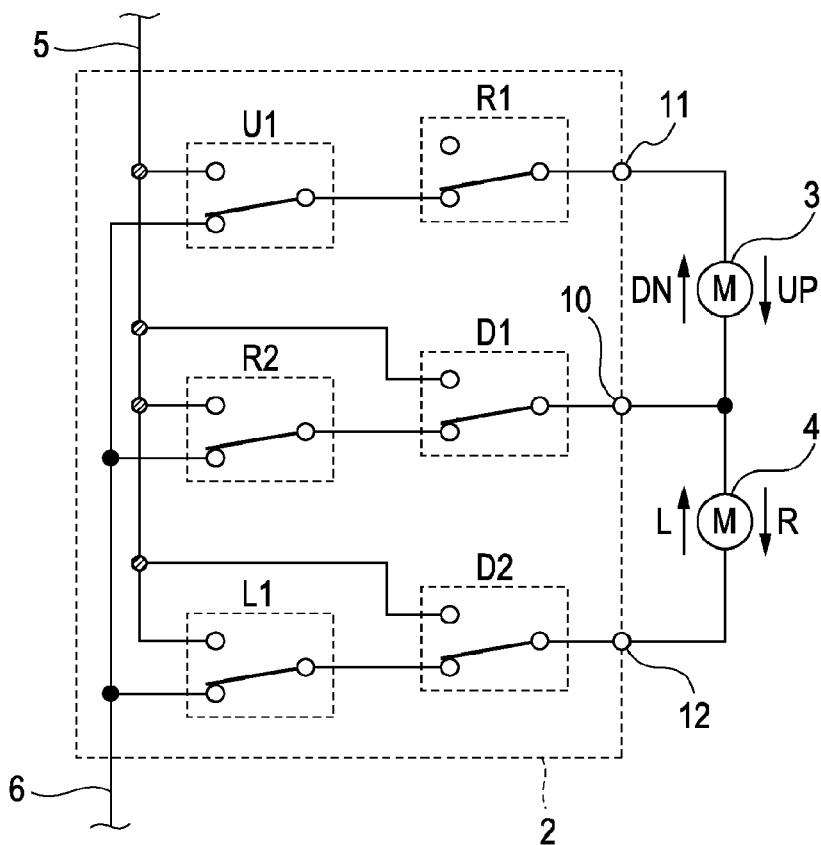
FIG. 15 is a circuit diagram of a drive unit according to a sixth embodiment.
FIG. 16 is a table which represents operation states in the sixth embodiment.
Figure 20:
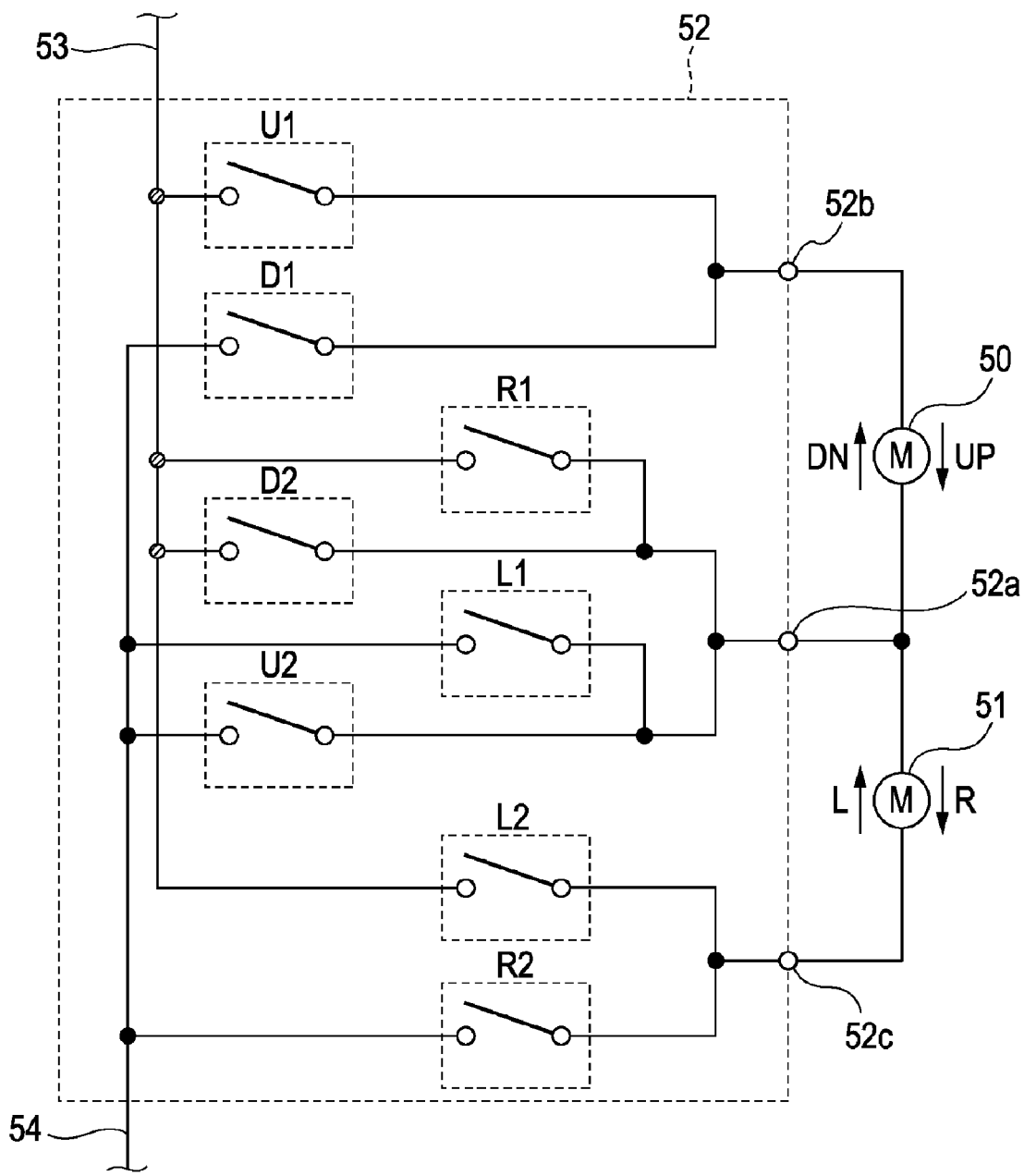
FIG. 20 is a circuit diagram of a related art drive unit.
Figures 21, 22:
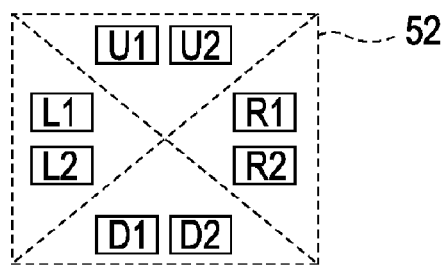
FIG. 21 illustrates a layout of switches constituting a switch section of the related art drive unit.
FIG. 22 is a table which represents operation states of the related art drive unit.

A sixth embodiment according to the present invention will be described. FIG. 15 is a circuit diagram of the drive unit according to the sixth embodiment. The layout of the respective switches of the switch section 2 in the drive unit according to the present embodiment is the same as that of the first embodiment.

Referring to FIG. 15, the circuit structure of the switch section 2 of the present embodiment is substantially the same as that of the first embodiment except the connection of the switch D2. The switch D2 is connected to the second terminal 12 at the common contact, having one switching contact connected to the switch L1 and the other switching contact connected to the power wire 5. The switch D2 is connected to the switch L1 in the state where none of the switches shown in FIG. 15 is operated.

The operation of the thus connected circuit upon operation of the operation member 1 will be described. FIG. 16 is a table representing the operation states of the switch section 2. In the present embodiment, the switch D2 is switched upon operation of the lower operation section 1b of the operation member 1 so as to connect the second terminal 12 to the power wire 5. Since the common terminal 10 is connected to the power wire 5 via the switch D1, each potential at both terminals of the second motor 4 becomes the same, which allows the structure to be the same as that of the first embodiment with respect to any operation. The switch D2 may be connected in the manner different from that of the first embodiment to allow the drive unit to conduct the similar operation.

A seventh embodiment according to the present invention will be described. FIG. 17 is a circuit diagram of the drive unit according to the seventh embodiment, and FIG. 18 illustrates the layout of the respective switches of the switch section 2. The drive unit of the present embodiment is formed by adding switches to the switch section 2 of the drive unit according to the sixth embodiment. Referring to FIG. 18, switches U2, L2 and D3 are added to the structure of the sixth embodiment at the up, left and down positions, respectively.

Referring to FIG. 17, the switch D3 is added to the switch section 2 according to the embodiment shown in FIG. 6 between the switch R1 and the first terminal 11, the switch L2 is added between the switch D1 and the common terminal 10, and the switch U2 is added between the switch D2 and the second terminal 12.

The switch D3 has the common contact connected to the first terminal 11, one switching contact connected to the switch R1, and the other switching contact connected to the grounding wire 6. The switch L2 has the common contact connected to the common terminal 10, one switching contact connected to the switch D1, and the other switching contact connected to the grounding wire 6. The switch U2 has the common contact connected to the second terminal 12, one switching contact connected to the switch D2, and the other switching contact connected to the grounding wire 6.

The operation states of the thus structured embodiment are shown in the table of FIG. 19. In the sixth embodiment, when the lower operations section 1b and the right operation section 1c of the operation member 1 are simultaneously operated, the common terminal 10 is connected to the power wire 5, and the second terminal 12 is also connected to the power wire 5 while having the first terminal 11 opened via the switch R1. Accordingly, the first motor 3 and the second motor 4 are not activated. Meanwhile, in the present embodiment, when the lower operation section 1b and the right operation section 1c of the operation member 1 are simultaneously operated, the first terminal 11 is connected to the grounding wire 6 via the switch D3, the common terminal 10 is connected to the grounding wire 6 via the switch L2, and the second terminal 12 is connected to the power wire 5 via the switch D2, respectively. So the first motor 3 is not activated, and the second motor 4 is activated to drive the mirror surface leftward.

In the sixth embodiment, when the upper operation section 1a and the left operation section 1d of the operation member 1 are simultaneously operated, the first terminal 11 is connected to the power wire 5 via the switch U1, the common terminal 10 is connected to the grounding wire 6, and the second terminal 12 is connected to the power wire 5 via the switch L1. Accordingly, the first motor 3 and the second motor 4 are activated. Meanwhile, in the present embodiment, when the upper operation section 1a and the left operation section 1*d* of the operation member 1 are simultaneously operated, the first terminal 11 is connected to the power wire 5 via the switch U1, the common terminal 10 is connected to the grounding wire 6 via the switch L2, and the second terminal 12 is connected to the grounding wire 6 via the switch U2. So the first motor 3 is activated to drive the mirror surface upward, and the second motor 4 is not activated.

This embodiment is formed by adding the switches U2, D3 and L2 to the drive unit according to the sixth embodiment so as to make sure that at least one motor is unidirectionally activated in the case where simultaneous operations in the plural directions are performed while preventing both the motors from being activated or inactivated upon operation toward predetermined plural directions.

Having been described with respect to embodiments according to the present invention, it is to be understood that the application of the present invention is not limited to the aforementioned embodiments but available in various fields within the scope of the invention. For example, the left/right switches and the up/down switches may be interchanged. Upon replacement as described above, the current flow direction between the terminals will be reversed. The direction for driving the mirror by the respective motors may be set in accordance with the current flow direction.

What is claimed is:

1. A drive unit comprising:
   an operation member which is operated in four directions of up, down, left and right;
   a switch section formed of a switch or a switch group arranged at each of four positions corresponding to operation directions of the operation member;
   a pair of motors to which the switch section is connected; and
   a grounding wire and a power wire,
   wherein the switch section includes a common terminal connected to a terminal at one end of each of the pair of motors, a first terminal connected to a terminal at the other end of one of the motors, a second terminal connected to a terminal at the other end of the other of the motors, and three-contact switches each including one common contact and two switching contacts,
   wherein in the switch section two switches corresponding to one direction selected from the up and down directions form a switch group, at least one switch corresponding to the other direction selected from the up and down directions is provided, two switches corresponding to one direction selected from the left and right directions form a switch group, and at least one switch corresponding to the other direction selected from the left and right directions is provided,
   wherein the common terminal is connected to one of the switches corresponding to the one direction selected from the up and down directions, and the switch is further connected in series to one of the switches corresponding to the one direction selected from the left and right directions,
   wherein the first terminal is connected to the other of the switches corresponding to the one direction selected from the left and right directions, and the switch is connected in series to the switch corresponding to the other direction selected from the up and down directions,
   wherein the second terminal is connected to the other of the switches corresponding to the one direction selected from the up and down directions, and the switch is connected in series to the switch corresponding to the other direction selected from the left and right directions,
   wherein the one of the switches corresponding to the one direction selected from the up and down directions connected to the common terminal is connected to the switch in series when the operation member is not operated, and is connected to the power wire when the operation member is operated,
   wherein when the operation member is not operated the other of the switches corresponding to the one direction selected from the left and right directions connected to the first terminal is connected to the switch corresponding to the other direction selected from the up and down directions and the other of the switches corresponding to the one direction selected from the up and down directions connected to the second terminal is connected to the switch corresponding to the other direction selected from the left and right directions, and the switch connected to the first terminal and the switch connected to the second terminal are brought into open states when the operation member is operated, and
   wherein the switches of the switch section connected to the common terminal, the switch corresponding to the other direction selected from the left and right directions, and the switch corresponding to the other direction selected from the up and down directions are connected to the grounding wire when the operation member is not operated, and are connected to the power wire when the operation member is operated.

2. The drive unit according to claim 1, wherein
   the switch section further includes a second switch corresponding to the other direction selected from the left and right directions, the second switch being connected to the first terminal in parallel with the one of the switches corresponding to the one direction selected from the left and right directions, the second switch being connected to a contact at an open side of the other switch corresponding to the one direction selected from the up and down directions when the operation member is not operated, the second switch being brought into an open state when the operation member is operated.

3. The drive unit according to claim 1, wherein
   a contact at an open side of the other switch corresponding to the one direction selected from the left and right directions connected to the first terminal is connected to a contact at an open side of the other of the switches corresponding to the one direction selected from the up and down directions connected to the second terminal.

4. The drive unit according to claim 3, wherein
   a second switch corresponding to the other direction selected from the left and right directions is provided in series between the other of the switches corresponding to the one direction selected from the left and right directions and the first terminal, the second switch being connected to the other of the switches corresponding to the one direction selected from the left and right directions when the operation member is not operated, the second switch being connected to the grounding wire when the operation member is operated.

5. The drive unit according to claim 3, wherein
   a second switch corresponding to the other direction selected from the up and down directions is provided in series between the other of the switches corresponding to the one direction selected from the up and down directions and the second terminal, the second switch being connected to the other of the switches corresponding to the one direction selected from the up and down direction when the operation member is not operated, the second switch being connected to the grounding wire when the operation member is operated.

6. The drive unit according to claim 1, wherein
the other of the switches corresponding to the one direction selected from the up and down directions connected to the second terminal is connected to the power wire instead of being opened when the operation member is operated.

7. The drive unit according to claim 6,
wherein a second switch corresponding to the other direction selected from the up and down directions is provided in series between the other of the switches corresponding to the one direction selected from the up and down directions and the second terminal, the second switch being connected to the other of the switches corresponding to the one direction selected from the up and down directions when the operation member is not operated, the second switch being connected to the grounding wire when the operation member is operated,
wherein a second switch corresponding to the other direction selected from the left and right directions is provided in series between the one of the switches corresponding to the one direction selected from the up and down directions and the common contact, the second switch being connected to one of the switches corresponding to the one direction selected from the up and down directions when the operation member is not operated, the second switch being connected to the grounding wire when the operation member is operated, and
wherein a third switch corresponding to the one direction selected from the up and down directions is provided in series between the other of the switches corresponding to the one direction selected from the left and right directions and the first terminal, the third switch being connected to the other of the switches corresponding to the one direction selected from the left and right directions when the operation member is not operated, the third switch being connected to the grounding wire when the operation member is operated.

* * * * *